United States Patent [19]

Bugner et al.

[11] Patent Number: 5,985,017
[45] Date of Patent: Nov. 16, 1999

[54] POTASSIUM N-METHYL-N-OLEOYL TAURATE AS A DISPERSANT IN PIGMENTED INK JET INKS

[75] Inventors: Douglas E. Bugner, Rochester; Alexandra D. Bermel, Spencerport; William Gruenbaum, Rochester, all of N.Y.

[73] Assignee: Eastman Kodak Company, Rochester, N.Y.

[21] Appl. No.: 09/179,497

[22] Filed: Oct. 27, 1998

[51] Int. Cl.⁶ .................................................. C09D 11/02
[52] U.S. Cl. ..................................... 106/31.75; 106/31.77; 106/31.86
[58] Field of Search ............................. 106/31.75, 31.77, 106/31.86

[56] References Cited

U.S. PATENT DOCUMENTS

| | | | |
|---|---|---|---|
| 5,651,813 | 7/1997 | Santilli et al. | 106/31.78 |
| 5,679,138 | 10/1997 | Bishop et al. | 106/31.75 |
| 5,698,018 | 12/1997 | Bishop et al. | 106/31.77 |
| 5,716,436 | 2/1998 | Sorriero et al. | 106/31.87 |
| 5,728,206 | 3/1998 | Badejo | 106/31.75 |
| 5,738,715 | 4/1998 | Santilli et al. | 106/31.6 |
| 5,741,356 | 4/1998 | Badejo et al. | 106/500 |
| 5,753,021 | 5/1998 | Martin | 106/31.75 |
| 5,792,380 | 8/1998 | Wen et al. | 106/31.64 |
| 5,837,044 | 11/1998 | Santilli et al. | 106/31.86 |

*Primary Examiner*—Helene Klemanski
*Attorney, Agent, or Firm*—John R. Everett

[57] ABSTRACT

An ink jet printing method is described. It comprising the steps of: providing an ink jet printer that is responsive to digital data signals; loading the printer with ink receptive substrates; loading the printer with an aqueous ink jet ink, said ink A) comprising a pigment, an aqueous carrier and potassium N-methyl-N-oleoyl taurate; and B) having a surface tension of 20 to 60 dynes/cm at 25° C., a viscosity of 1 to 10 centipoise at 25° C. and a particle size of less than 1.0 μm; and printing on the ink receptive substrate in response to the digital data signals.

10 Claims, No Drawings

POTASSIUM N-METHYL-N-OLEOYL TAURATE AS A DISPERSANT IN PIGMENTED INK JET INKS

FIELD OF THE INVENTION

This invention relates to the field of ink jet printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

The inks used in ink jet printers are generally classified as either dye-based or pigment-based. In pigment-based inks, the colorant exists as discrete particles. These pigment particles are usually treated with addenda known as dispersants or stabilizers which serve to keep the pigment particles from agglomerating and settling out of the carrier. The process of preparing inks from pigments commonly involves two steps: (a) a dispersing or milling step to break up the pigment to the desired particle size, and (b) a dilution step in which the dispersed pigment concentrate is diluted with a carrier and other addenda to a working strength ink. In the milling step, the pigment is usually suspended in a carrier (typically the same carrier as that in the finished ink) along with rigid, inert milling media.

Mechanical energy is supplied to this pigment dispersion, and the collisions between the milling media and the pigment cause the pigment particles to be reduced in size. A dispersant or stabilizer, or both, is commonly added to the pigment dispersion to facilitate the deaggregation of the raw pigment, to maintain colloidal particle stability, and to retard particle reagglomeration and settling. Although there are known in the prior art a wide variety of dispersing agents for pigmented ink jet inks, they are not without certain problems. For example, many dispersing agents are very selective as far as being able to disperse pigments to sub-micron size. In many instances each class of pigments may require a specific dispersing agent. Another problem encountered with polymeric dispersing agents is that they tend to impart an undesirable high viscosity to the resulting inks. Thus there is a continuing need for improved dispersing agents for pigmented inks.

U.S. Pat. No. 5,512,968 discloses ammonium and sodium N-methyl-N-oleoyl taurate for use as dispersant in ink jet inks. The problem is that when sodium N-oleoyl-N-methyltaurate (NaOMT) the dispersion foams excessively. This requires use of a defoamer. Ammonium N-oleoyl-N-methyltaurate methyltaurate is not commercially available, and produces $NH_3$ when the pH of the solution is raised.

SUMMARY OF THE INVENTION

The present invention provides an ink jet printing method, comprising the steps of: providing an ink jet printer that is responsive to digital data signals; loading the printer with ink receptive substrates; loading the printer with an aqueous ink jet ink, said ink A) comprising a pigment, an aqueous carrier and potassium N-methyl-N-oleoyl taurate; and B) having a surface tension of 20 to 60 dynes/cm at 25° C., a viscosity of 1 to 10 centipoise at 25° C. and a particle size of less than 1.0 μm; and printing on the ink receptive substrate in response to the digital data signals.

The present invention teaches how to obtain useful ink formulations with Potassium N-methyl-N-oleoyltaurate (KOMT) as a dispersing agent. KOMT is very effective in reducing pigments of various chemical compositions to a size less than 1.0 μm during the milling process. This invention also results in very stable colloidal dispersions free from flocculation and/or sedimentation for long periods of time. KOMT is useful with a wide variety of pigments, including both organic and inorganic. Moreover when KOMT is used as a dispersant, the foaming level is significantly and unexpectedly reduced and no defoamer is required to achieve particle size reduction comparable to that achieved with NaOMT. From 0.05 to 0.75 weight percent of KOMT relative to the pigment weight is effective.

DETAILED DESCRIPTION

Ink jet inks of this invention are made by the process of:

(A) providing a dispersion containing a pigment, a carrier for the pigment and as a dispersant potassium N-methyl-oleoyl taurate (KOMT);

(B) mixing the pigment dispersion with rigid milling media;

(C) introducing the mixture of step (B) into a mill;

(D) milling the mixture from step (C) until the pigment particle size is less than 1.0 μm;

(E) separating the milling media from the mixture milled in step (D); and (F) diluting the mixture from step (E) to obtain an ink jet ink having a pigment concentration suitable for ink jet printers.

Potassium N-methyl-N-oleoyltaurate (KOMT) was prepared by treating NaOMT twice with excess potassium hydroxide as follows. A mixture of sodium N-methyl-N-oleoyltaurate (NaOMT) (280 g, 0.66 mol), methanol (950 mL) and water (118 mL) was heated to 65° C. with magnetic stirring to dissolve the NaOMT. Potassium hydroxide (2.08 mol, 180 mL of 45% aqueous solution) was added in a thin stream over 5 minutes. The hazy, colorless NaOMT solution clarified and deepened to a yellow color as the KOH was added. The temperature increased to 73° C. The transparent yellow solution was heated for five more minutes, then left to cool, with stirring, on the hot plate/stirrer overnight.

The room temperature reaction mixture, a white slurry, was collected by suction filtration. The damp filter cake was transferred to a crystallizing dish, and dried for a week at room temperature under vacuum.

The dried product was treated with excess KOH a second time. The waxy white solid (270 g) was mixed with 950 mL of MeOH and 118 mL of $H_2O$, heated to 65° C. to dissolve, and treated with 180 mL of 45% aqueous KOH. The reaction was heated for a few more minutes, then left to cool overnight. The cooled white slurry was suction filtered to a damp cake, which was then slurried overnight in a mixture of 1000 mL MeOH and 100 mL $H_2O$. The aqueous MeOH slurry was suction filtered to a damp cake, then slurried overnight in 1500 mL of acetone. The acetone slurry was suction filtered to a cake, then dried 3 days under vacuum at room temperature. The product was pulverized in a mortar and pestle, then dried one more day to constant weight under vacuum at room temperature. The final product, a waxy white solid, was used without further purification.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin.

In general, polymeric resins suitable for use herein are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids), copolymers of lactides and glycolide, polyanhydrides, poly(imino carbonates), poly(N-acylhydroxyproline) esters, poly(N-palmitoyl hydroxyproline) esters, ethylene-vinyl acetate copolymers, poly(orthoesters), poly(caprolactones), and poly (phosphazenes). The polymeric resin can have a density from 0.9 to 3.0 g/cm$^3$.

Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, and the impeller diameter. Sufficient milling media velocity is achieved, for example, in a Cowles-type saw tooth impeller having a diameter of 40 mm when operated at 9,000 rpm. The preferred proportions of the milling media, the pigment, the liquid dispersion medium and dispersant can vary within wide limits and depends, for example, upon the particular material selected and the size and density of the milling media etc. The process can be carried out in a continuous or batch mode. Batch Milling A slurry of <100 μm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling. A slurry of <100 μm milling media, liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving or filtration. In either mode, the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water.

For aqueous ink jet inks, the pigment is usually present in the mill grind at 1 to 50 weight %, excluding the milling media. The weight ratio of pigment to dispersant may range from 20:1 to 1:2. The high speed mill is a high agitation device, such as those manufactured by Morehouse-Cowles, Hockmeyer et al.

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

In the present invention, any of the known pigments can be used. Pigments can be selected from those disclosed, for example, in U.S. Pat. Nos. 5,026,427; 5,085,698; 5,141,556; 5,160,370; 5,738,716, and 5,169,436. The exact choice of pigment will depend upon the specific color reproduction and image stability requirements of the printer and application. For four-color printers, combinations of cyan, magenta, yellow, and black (CMYK) pigments should be used. An exemplary four color set may be copper phthalocyanine (Pigment Blue 15), quinacridone magenta (Pigment Red 122), Pigment Yellow 139 and carbon black (Pigment Black 7).

The inks of the present invention are intended to be used in three- or four-color ink jet printers, e.g., printers, which contain print cartridges capable of printing cyan, magenta, and yellow (CMY three-color printers), or cyan, magenta, yellow and black (CMYK four-color printers). It is especially important to select a set of CMY or CMYK pigments which demonstrate excellent lightfastness and which yield as wide a color gamut as possible. In this regard the preferred black pigment is pigment black 7, also known as carbon black, and the preferred magenta pigment is a quinacridone pigment such as pigment red 122.

The choice yellow pigment is less straightforward. Preferred yellow pigments are the so-called non-benzidine yellows. This is because yellow pigments based on the benzidine chromophore have been shown to yield potentially toxic byproducts when the degrade. Of the non-benzidine yellow pigments, pigment yellow 138, pigment yellow 139, pigment yellow 180, pigment yellow 74, pigment yellow 185, pigment yellow 154 and mixtures thereof are preferred. Especially preferred is pigment yellow 74. Pigment numbers are as designated in the Color Index.

Although commercially available cyan pigments such as pigment blue 15 (copper phthalocyanine) are well-known for their excellent lightfastness, they tend to be more blue than cyan in hue, and thus the overall color gamut is limited when they are used in conjunction with the preferred magenta, yellow and black pigments noted above. Hydroxy aluminum phthalocyanine exhibits a greener hue than copper phthalocyanine, but suffers from relatively poor lightfastness. One class of cyan pigments which display both excellent hue and lightfastness are the so-called bridged aluminum phthalocyanines as described in U.S. Pat. No. 4,311,775, incorporated herein by reference. These pigments are generically represented by the following formulas:

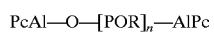

where Pc represents a substituted or unsubstituted phthalocyanine ring, R is an alkyl group, an aryl group or an arakyl group, and n is an integer from 0 to 4. For a more complete description of these pigments, see U.S. Pat. No. 4,311,775. A useful siloxane-bridged aluminum phthalocyanine is bis (phthalocyanylalumino)tetraphenyldisiloxane (Pc is unsubstituted, R is phenyl, and n is 2). Mixtures of bis (phthalocyanylalumino)tetraphenyldisiloxane with either copper phthalocyanine, hydroxyaluminum phthalocyanine or both may also be used provided that bis (phthalocyanylalumino)tetraphenyldisiloxane comprises at least 80 weight percent of the mixture.

A useful 3-color ink set comprises pigment red 122, pigment yellow 74 and bis(phthalocyanylalumino) tetraphenyldisiloxane.

A useful 4-color pigmented ink set comprises pigment black 7, pigment red 122, pigment yellow 74, and bis (phthalocyanylalumino)tetraphenyldisiloxane.

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 1,5-pentanediol, 2-methyl-2,4-pentanediol, 1,2,6-hexanetriol, 2-ethyl-2-hydroxymethylpropane-1,3-diol and thiodiglycol; (6) lower alkyl mono- or diethers derived from alkylene glycols, such as ethylene glycol monomethyl (or -ethyl) ether, diethylene glycol monomethyl (or -ethyl) ether, propylene glycol monomethyl (or -ethyl) ether, triethylene glycol monomethyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone. Particularly useful solvents are selected from the group consisting of methyl alcohol, ethyl alcohol, n-propyl alcohol, isopropyl alcohol, n-butyl alcohol, iso-butyl alcohol, sec-butyl alcohol, ethylene glycol, diethylene glycol, propylene gylcol, dipropylene glycol, 1,5-pentanediol, thiodiglycol, 2-ethyl-2-hydroxymethylpropane-1,3-diol, 2-pyrrolidone, N-methyl-2-pyrrolodone 2-pyrrolidone and mixtures of two or more of such solvents.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. The potassium N-methyl-N-oleoyl taurate is present in the ink composition in an amount from 0.05 to 10.0, weight percent. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm at room temperature. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols™ from Air Products; the Zonyls™ from DuPont and the Fluorads™ from 3M.

Acceptable viscosities are no greater than 20 centipoise, and preferably in the range of about 1.0 to about 10.0, preferably 1.0 to 5.0 centipoise at room temperature (25° C.).

Inks according to this invention have a total trace metal contamination concentration of less than 100 parts per million of ink containing 2.5% by weight of pigment.

The ink has physical properties compatible with a wide range of ejecting conditions, i. e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or cosolvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel™ GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents and drying agents.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers. Commercially available ink jet printers use several different schemes to control the deposition of the ink droplets. Such schemes are generally of two types: continuous stream and drop-ondemand. In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the effectiveness of KOMT in the preparation of ink jet inks and in maintaining the stability of ink jet inks. In each of the slurries containing 50 micron milling media, high purity water, pigment and dispersant were prepared using simple mixing. The magenta pigment was Pigment Red 122 (PR 122), a quinacridone type pigment obtained from Sun Chemical Company as Sunfast Magenta 122. The yellow was Pigment Yellow 74 (PY 74), a non-benzidine yellow obtained from Clariant Chemical Company as Hansa Brilliant Yellow 5GX-03. The cyan pigment was a Kodak proprietary siloxane-bridged aluminum phthalocyanine obtained from the Synthetic Chemicals Division of Eastman Kodak Company. The black was carbon black, obtained from Cabot Corporation as Black Pearls 880 Carbon Black. The defoamer used was Surfynol # DF-75 from Air Products and Chemicals, Inc. In all the examples below, the slurries were milled in a 2 liter water-jacketed vessel. The temperature of the slurries was maintained between 24 and 28° C. The height of the foam was measured as the milling progressed and is reported in the examples below. The slurry was milled to allow comminution of the pigment to a minimum particle size according to the procedures previously describe herein and also disclosed in U.S. Pat. No. 5,679,138. After milling was complete, the dispersion of water, pigment and dispersant (the "mill grind") was separated from the grinding media by filtration. Pigment particle size distributions (PSDs) were measured on a Leeds and Northrup Microtrac Model 150 Ultrafine Particle Size Analyzer (UPA). The particle size is reported as $D_x$ where x is the percent of particles smaller than the $D_x$ value. For example "$D_{95}$" (nanometers) means 95% of the particles are smaller than the $D_{95}$ value.

EXAMPLE 1

MAGENTA

Two 250 g dispersions were prepared, one containing 13% magenta pigment, 3.9% NaOMT and 83.1% high purity water and the other containing 13% magenta pigment, 3.9% KOMT and 83.1% high purity water. Both dispersions were milled as described above, using a 50 mm Cowles blade at 7000 rpm. The height of the foam in the milling vessel was measured as a function of time, and the results are presented in Table 1.

TABLE 1

| | MAGENTA | |
|---|---|---|
| Mill Time (min) | NaOMT Foam Height (cm) | KOMT Foam Height (cm) |
| 1 | 5.08 | 5.72 |
| 15 | 8.26 | 5.72 |
| 30 | 8.26 | 6.35 |
| 45 | 8.26 | 5.72 |
| 60 | 7.62 | 6.35 |
| 120 | 7.62 | 5.72 |
| 180 | 7.62 | 5.72 |

EXAMPLE 2

Two 250 g dispersions were prepared, one containing 13.00% yellow pigment, 1.62% NaOMT and 85.38% high purity water and the other containing 13.00% yellow pigment, 1.62% KOMT and 85.38% high purity water. Both dispersions were milled as described above, using a 50 mm Cowles blade at 7000 rpm height of the foam in the milling vessel was measured as a function of time, and the results are presented in Table 2.

TABLE 2

| | YELLOW | |
|---|---|---|
| Mill Time (min) | NaOMT Foam Height (cm) | KOMT Foam Height (cm) |
| 1 | 6.35 | 6.35 |
| 15 | 9.52 | 8.26 |
| 30 | 9.52 | 8.26 |
| 45 | 9.52 | 7.62 |
| 60 | 9.52 | 6.99 |
| 120 | 10.16 | 6.99 |

EXAMPLE 3

Two 250 g dispersions were prepared, one containing 14.00% cyan pigment, 8.40% NaOMT and 77.60% high purity water and the other containing 14.00% cyan pigment, 8.40% KOMT and 77.60% high purity water. Both dispersions were milled as described above, using a 50 mm Cowles blade at 7000 rpm. The height of the foam in the milling vessel was measured as a function of time, and the results are presented in Table 3.

TABLE 3

| | CYAN | |
|---|---|---|
| Mill Time (min) | NaOMT Foam Height (cm) | KOMT Foam Height (cm) |
| 1 | 6.99 | 6.35 |
| 15 | 8.89 | 6.35 |
| 30 | 8.26 | 6.35 |
| 45 | 8.26 | 6.35 |
| 60 | 8.26 | 6.35 |
| 120 | 8.26 | 6.35 |
| 180 | 8.26 | 6.35 |

EXAMPLE 4

Two 250 g dispersions were prepared, one containing 16.00% black pigment, 4.00% NaOMT and 80.00% high purity water and the other containing 16.00% cyan pigment, 4.00% KOMT and 80.00% high purity water. Both dispersions were milled as described above, using a 50 mm Cowles blade at 7000 rpm. The height of the foam in the milling vessel was measured as a function of time, and the results are presented in Table 4.

TABLE 4

| | BLACK | |
|---|---|---|
| Mill Time (min) | NaOMT Foam Height (cm) | KOMT Foam Height (cm) |
| 1 | 7.62 | 6.99 |
| 15 | 8.26 | 6.35 |
| 30 | 8.26 | 6.35 |
| 45 | 8.26 | 6.35 |
| 60 | 8.26 | 6.35 |
| 120 | 8.26 | 6.35 |
| 180 | 8.26 | 6.35 |

EXAMPLE 5

Two dispersions were prepared: one containing 20.00% yellow pigment, 2.50 NaOMT and 77.50% high purity water, and the other containing 20.00% yellow pigment, 2.50 KOMT and 77.50% high purity water. In each case, a 2 liter vessel was used and the total dispersion weight was 517 g. Both dispersions were milled as described above, using a 50 mm Cowles blade at 5700 rpm. The dispersion containing the NaOMT foamed excessively, and the dispersions overflowed the container. As a result, that trial was aborted. The dispersons containing the KOMT had a very low level of foam: the slurry was milled to allow comminution of the pigment to a minimum particle size and the final particle size of the pigment is given in Table 5.

TABLE 5

| Example # | Pigment | Dispersant NaOMT or KOMT | Final Particle Size Distribution (nm) | | | |
|---|---|---|---|---|---|---|
| | | | D10 | D50 | D95 | D100 |
| 5 | Yellow | KOMT | 10 | 12 | 41 | 144 |
| 6 | Yellow | NaOMT | 10 | 13 | 34 | 122 |
| 6 | Yellow | KOMT | 9 | 13 | 34 | 122 |
| 7 | Magenta | NaOMT | 15 | 21 | 61 | 122 |
| 7 | Magenta | KOMT | 12 | 16 | 56 | 122 |
| 8 | Cyan | NaOMT | 14 | 20 | 114 | 243 |
| 8 | Cyan | KOMT | 10 | 13 | 52 | 144 |
| 9 | Black | NaOMT | 45 | 69 | 113 | 204 |
| 9 | Black | KOMT | 37 | 66 | 120 | 204 |

EXAMPLE 6

Two 250 g dispersions were prepared, one containing 13.00% yellow pigment, 1.62% NaOMT and 85.38% high purity water and the other containing 13.00% yellow pigment, 1.62% KOMT and 85.38% high purity water. Both dispersions were milled as described above, using a 50 mm Cowles blade at 7000 rpm. It was necessary to add 2–3 drops of a defoamer, DF-75 to the dispersion containing NaOMT to reduce the level of foam. The slurries were milled to allow comminution of the pigment to a minimum particle size; the final particle sizes of the dispersions are given in Table 5, above

EXAMPLE 7

Two 250 g dispersions were prepared, one containing 13% magenta pigment, 3.9% NaOMT and 83.1% high purity water and the other containing 13% magenta pigment, 3.9% KOMT and 83.1% high purity water. Both dispersions were milled as described above, using a 50 mm Cowles blade at 7000 rpm. The slurries were milled to allow comminution of the pigment to a minimum particle size; the final particle sizes of the dispersions are given in Table 5 above.

EXAMPLE 8

Two dispersions were prepared, one containing 14.00% cyan pigment, 8.40% NaOMT and 77.60% high purity water, and the other containing 14.00% cyan pigment, 8.40% KOMT and 77.60% high purity water. Both dispersions were milled as described above, using a 60 mm Cowles blade at 5700 rpm, and the total dispersion weight was 570 g. It was necessary to add defoamer to the dispersion containing the NaOMT in order to prevent it from overflowing the vessel. The level of foam for the the dispersion containing the KOMT was very low. The slurries were milled to allow comminution of the pigment to a minimum particle size; the final particle sizes of the dispersions are given in Table 5 above.

EXAMPLE 9

Two 250 g dispersions were prepared, one containing 16% black pigment, 4% NaOMT and 80% high purity water, and the other containing 16% black pigment, 4% KOMT and 80% high purity water. Both dispersions were milled as described above, using a 50 mm Cowles blade at 7000 rpm. The slurries were milled to allow comminution of the pigment to a minimum particle size; the final particle sizes of the dispersions are given in Table 5.

The data in Tables 1–4 indicate that the level of foam generated when pigments are milled with KOMT is significantly lower than the level of foam generated when the pigments are milled with NaOMT. The foam is undesirable because it interferes with the milling process, as evidenced in Example 5, where the dispersion containing NaOMT foamed over the milling vessel and had to be aborted. The data in examples 6–8 indicate that the pigment particle size achieved using the KOMT is equivalent to that achieved using NaOMT.

These examples and the accompanying tables establish that in the pigment particle size reduction process (1) KOMT dispersant solves the problem of excessive foam produced when NaOMT is used as a dispersant and (2) the pigment particle size achieved is essentially the same when either dispersant is used.

The invention has been described in detail with particular reference to preferred embodiments thereof, but it will be understood that variations and modifications can be effected within the spirit and scope of the invention.

We claim:

1. An ink jet printing method, comprising the steps of: providing an ink jet printer that is responsive to digital data signals; loading the printer with ink receptive substrates; loading the printer with an aqueous ink jet ink, said ink A) comprising a pigment, an aqueous carrier and potassium N-methyl-N-oleoyl taurate; and B) having a surface tension of 20 to 60 dynes/cm at 25° C., a viscosity of 1 to 10 centipoise at 25° C. and a particle size of less than 1.0 $\mu$m; and printing on the ink receptive substrate in response to the digital data signals.

2. The ink jet printing method of claim 1 comprising from 0.1 to 10.0 weight percent of a pigment and from 0.05 to 10.0 weight percent potassium N-methyl-N-oleoyl taurate.

3. The ink jet printing method of claim 1 wherein the pigment is selected from Pigment Black 7, Pigment Red 122, Pigment Blue 15, Pigment Yellow 139 and mixtures of two or more of such pigments.

4. The ink jet printing method of claim 1 wherein organic pigments are included.

5. The ink jet printing method of claim 1 wherein the ink further comprises a cosolvent selected from the group consisting of methyl alcohol, ethyl alcohol, n-propyl alcohol, iso-propyl alcohol, n-butyl alcohol, iso-butyl alcohol, sec-butyl alcohol, ethylene glycol, diethylene glycol, propylene glycol, dipropylene glycol, 1,5-pentanediol, thiodiglycol, 2-ethyl-2-hydroxymethylpropane -1,3-diol, 2-pyrrolidone, N-methyl-2-pyrrolidone and mixtures of two or more of such solvents.

6. An aqueous ink jet ink comprising A) a pigment, an aqueous carrier and potassium N-methyl-N-oleoyl taurate; and B) having a surface tension of 20 to 60 dynes/cm at 25° C., a viscosity of 1 to 10 centipoise at 25° C. and a particle size of less than 1.0 $\mu$m.

7. The ink of claim 6 comprising from 0.1 to 10.0 weight percent of a pigment and from 0.05 to 10.00 weight percent potassium N-methyl-N-oleoyl taurate.

8. The ink of claim 6 wherein the pigment is selected from Pigment Black 7, Pigment Red 122, bis (phthalocyanylalumino)tetraphenyldisiloxane, Pigment Yellow 74 and mixtures of two or more of such pigments.

9. The ink of claim 6 wherein organic pigments are included.

10. The ink of claim 6 further comprising a cosolvent selected from the group consisting of methyl alcohol, ethyl alcohol, n-propyl alcohol, iso-proplyl alcohol, n-butyl alcohol, iso-butyl alcohol, sec-butyl alcohol, ethylene glycol, diethylene glycol, propylene glycol, dipropylene glycol, 1,5-pentanediol, thiodiglycol, 2-ethyl-2-hydroxymethylpropane-1,3-diol, 2-pyrrolidone, N-methyl-2-pyrrolidone and mixtures of two or more of such solvents.

* * * * *